United States Patent
Bergljung et al.

(10) Patent No.: US 8,213,873 B2
(45) Date of Patent: Jul. 3, 2012

(54) METHOD AND APPARATUS FOR CHANNEL QUALITY REPORTING IN A WIRELESS COMMUNICATION SYSTEM

(75) Inventors: Christian Bergljung, Lund (SE); Fredrik Nordström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 98 days.

(21) Appl. No.: 12/900,559

(22) Filed: Oct. 8, 2010

(65) Prior Publication Data

US 2011/0250848 A1   Oct. 13, 2011

Related U.S. Application Data

(60) Provisional application No. 61/322,483, filed on Apr. 9, 2010.

(51) Int. Cl.
*H04B 17/00* (2006.01)
(52) U.S. Cl. ................. 455/67.11; 370/252
(58) Field of Classification Search ............. 455/67.11, 455/63.1, 423, 67.15; 370/252
See application file for complete search history.

(56) References Cited

U.S. PATENT DOCUMENTS

| | | | |
|---|---|---|---|
| 2007/0254603 A1 | 11/2007 | Li et al. | |
| 2008/0253336 A1* | 10/2008 | Parkvall et al. | 370/335 |
| 2008/0298482 A1 | 12/2008 | Rensburg et al. | |
| 2009/0046805 A1* | 2/2009 | Kim et al. | 375/295 |
| 2009/0052342 A1* | 2/2009 | Onodera et al. | 370/252 |
| 2009/0060010 A1* | 3/2009 | Maheshwari et al. | 375/211 |
| 2009/0067391 A1* | 3/2009 | Shen et al. | 370/336 |
| 2009/0180561 A1* | 7/2009 | Kim et al. | 375/260 |
| 2010/0035555 A1* | 2/2010 | Bala et al. | 455/63.1 |
| 2010/0093287 A1* | 4/2010 | Higuchi et al. | 455/67.13 |
| 2011/0032839 A1* | 2/2011 | Chen et al. | 370/252 |
| 2012/0002556 A1* | 1/2012 | Kishiyama et al. | 370/252 |

FOREIGN PATENT DOCUMENTS

EP   1898540 A1   3/2008

OTHER PUBLICATIONS

3RD Generation Partnership Project. 3GPP TS 36.211, V9.1.0 (Mar. 2010). 3rd Generation Partnership Project; Technical Specification Group Radio Access Network; Evolved Universal Terrestrial Radio Access (E-UTRA); Physical Channels and Modulation (Release 9). Mar. 2010.

(Continued)

*Primary Examiner* — Lewis West
(74) *Attorney, Agent, or Firm* — Coats & Bennett, P.L.L.C.

(57) ABSTRACT

According to one aspect, the present invention advantageously provides a method and apparatus that increase communications throughput by manipulating the order or manner in which CQI values are reported in a multi-rank CQI report that constrains one or more such values according to reporting order. As a non-limiting example, the present invention provides that the reporting order used for reporting multiple CQI values is chosen to eliminate or at least reduce under-reporting and over-reporting errors arising from the use of differential reporting formats for one or more of the reported CQI values. Additionally, the present invention provides for selection between single-rank or multi-rank CQI reporting, based on determining which one corresponds to the highest channel capacity, in view of the differential reporting constraints.

16 Claims, 3 Drawing Sheets

OTHER PUBLICATIONS

3RD Generation Partnership Project. 3GPP TS 36.213, V9.1.0 (Mar. 2010). 3rd Generation Partnership Project; Technical Specification Group Radio Access Network; Evolved Universal Terrestrial Radio Access (E-UTRA); Physical layer procedures (Release 9). Mar. 2010.

Cheng, J.-F. (Thomas). "Coding Performance of Hybrid ARQ Schemes." IEEE Transactions on Communications, vol. 54, No. 6, Jun. 2006, pp. 1017-1029.

Lee et al., "MIMO Technologies in 3GPP LTE and LTE-Advanced," EURASIP Journal on Wireless Communications and Networking, vol. 2009, pp. 1-10, Jan. 1, 2009.

Sandhu et al., "Near-Optimal Selection of Transmit Antennas for a MIMO Channel Based on Shannon Capacity," 2000 Conference Record of the 34th Asilomar Conference on Signals, Systems and Computers, Oct. 29-Nov. 1, 2000, vol. 1, pp. 567-571, Oct. 29, 2000.

Almeida et al., "Closed-Loop Hybrid MIMO System with Joint Transmit Antenna and Mode Selection Based on Capacity Maximization," 2010 IEEE Eleventh International Workshop on Signal Processing Advances in Wireless Communications (SPAWC), pp. 1-5, Jun. 20, 2010.

Bai et al., "On the Physical Layer Performance with Rank Indicator Selection in LTE/LTE-Advanced System," 2010 IEEE 21st International Symposium on Personal, Indoor, and Mobile Radio Communications (PIMTC) Workshops, pp. 393-398, Sep. 26-30, 2010, Istanbul, Turkey.

* cited by examiner

METHOD AND APPARATUS FOR CHANNEL QUALITY REPORTING IN A WIRELESS COMMUNICATION SYSTEM

RELATED APPLICATIONS

This application claims priority from the U.S. provisional patent application filed on 9 Apr. 2010 and assigned Application No. 61/322,483.

FIELD OF THE INVENTION

The present invention generally relates to wireless communication networks, and particularly relates to channel quality reporting in such networks.

BACKGROUND

In mobile communications, the transmission conditions change over time and space. Therefore, for a base station (BS) to properly schedule the transmission of data to an item of user equipment (UE), using appropriate modulation and code rates, the UE regularly reports channel conditions to the BS. In one approach to sending channel state information (CSI), the UE sends regular Channel Quality Indicator (CQI) reports. The CQI is an index value that efficiently quantizes measured signal quality at the UE.

Of course, there may be many UEs hosted on the same BS at the same time, and all UEs need to send CQI reports. Further, each UE may have multiple CQI values to report. For example, CQI reporting for an Orthogonal Frequency Division Multiplex (OFDM) downlink signal may require UEs to report wideband CQI values, along with one or more narrowband CQI values that are restricted to particular frequency sub-bands of interest. As such, CQI reports must contain as few bits as possible.

One approach to reducing the number of bits needed to report multiple CQI values adopts a "differential" reporting approach. With differential reporting, one or more CQI values are reported relative to one or more other CQI values. Long Term Evolution (LTE), as standardized by the Third Generation Partnership Project (3GPP) provides a specific example of differential reporting. Assuming LTE MIMO (Multiple-Input-Multiple-Output) transmission, an example CQI report from an LTE UE to an eNodeB includes one or more of the following items: a rank indicator (RI), a CQI value for the whole bandwidth, CQI values for parts of the bandwidth, and Precoding Matrix Indexes (PMIs), to guide transmission precoding by the BS.

The "rank" of a MIMO channel defines how many layers can be used in the transmission of data streams from a MIMO transmitter to a MIMO receiver, and the maximum rank is given as min $(N_{TX}, N_{RX})$. Here, "N" represents the number of transmit antennas (TX) or receive antennas (RX). UEs use the RI to indicate a rank preference, which the eNodeB may use in determining the appropriate channel rank to use for transmissions to the UE.

Currently, the LTE standards use a baseline antenna configuration of 2×2, which denotes two transmit antennas and two receive antennas, and provide for a maximum of two "codewords." Codewords are coded bits that are mapped to modulation symbols, which are then mapped to one or more layers. Each codeword thus may be understood as a different data stream, where the two codewords may have different modulation and coding schemes applied to them. Further, according to the (current) LTE standards, each codeword may use up to two layers in its transmission.

Thus, a UE receiving LTE MIMO transmissions on the downlink reports a CQI value for each codeword, where the CQI value reported for one of the codewords represents a differential value that specifies a limited-range offset relative to the CQI value reported for the other codeword. In more detail, assume a CQI reporting mode of "PUCCH 1-1" and a "Rank 2" transmission. (The "PUCCH 1-1" mode denotes CQI reporting by the UE on the Physical Uplink Control Channel (PUCCH), for Frequency Division Duplexing (FDD), assuming AWGN channel conditions.) In this context, the UE reports a 4-bit CQI value for the first codeword (CW1) and a 3 bit-differential CQI for the second codeword (CW2).

The differential CQI is defined as the CQI value determined for the second codeword (CQI2), as constrained by the differential offset limit of [−4, 3]. In other words, the CQI value for the second codeword is reported relative to the CQI value for the first codeword using three bits, instead of four bits. Therefore, CQI2 can take on only eight index values falling within the stipulated offset interval [−4, 3]. For more information regarding this formulation, and CQI reporting in general, within the LTE context, please refer to the following two documents: 3GPP 36.213, "Physical layer procedures", V9.1.0 (2010); and 3GPP 26.211, "Physical Channels and Modulation", V9.1.0 (2010).

SUMMARY

According to one aspect, the present invention advantageously provides a method and apparatus that increase communications throughput by manipulating the order or manner in which CQI values are reported in a multi-rank CQI report that constrains one or more such values according to reporting order. As a non-limiting example, the present invention provides that the reporting order used for reporting multiple CQI values is chosen to eliminate or at least reduce under-reporting and over-reporting errors arising from the use of differential reporting formats for one or more of the reported CQI values. Additionally, one or more embodiments of the present invention provide for selection between single-rank or multi-rank CQI reporting, based on determining which one corresponds to the highest channel capacity, in view of the differential reporting constraints.

Accordingly, in one embodiment, the present invention comprises a method of reporting channel quality from a first communication transceiver. The method includes receiving antenna-specific reference signals from a second communication transceiver that supports multi-rank and single-rank transmission to the first communication transceiver.

As one example, the first communication transceiver is a wireless communication device, such as a UE, and the second communication transceiver is a supporting base station, within a wireless communication network. In any case, the method further includes determining whether multi-rank transmission by the second communication transceiver is desired, based on evaluating channel conditions as estimated from the reference signals.

Still further, the method includes, for the case when multi-rank transmission is desired, sending a multi-rank Channel Quality Information (CQI) report to the second communication transceiver that reports two or more CQI values, for adapting multi-rank transmissions to the first communication transceiver, using a reporting order that dictates which reported CQI value or values are reported as absolute values and which reported CQI value or values are reported as offsets relative to one or more of the absolute values, using a bounded differential reporting format. The method further includes dynamically determining the reporting order, to reduce under-reporting or over-reporting errors that arise from the use of the bounded differential reporting format.

The same or other embodiments of the method further provide for determining whether multi-rank transmission by the second communication transceiver is desired. The determination is based on: (a) estimating a first metric reflecting a single-rank channel capacity and a second metric reflecting a multi-rank channel capacity; (b) comparing the first and second metrics; and (c) determining that multi-rank transmission by the second communication transceiver is desired, based at least in part on the multi-rank channel capacity being higher than the single-rank channel capacity. Conversely, the determination that single-rank transmission by the second communication transceiver is desired, rather than multi-rank transmission, is made based at least in part on determining that the single-rank channel capacity is higher than the multi-rank channel capacity. For the case where single-rank transmission is desired, the method includes sending a single-rank CQI report to the second communication transceiver.

In another embodiment, the present invention comprises a first communication transceiver that includes a receiver configured to receive antenna-specific reference signals from a second communication transceiver that supports multi-rank and single-rank transmission to the first communication transceiver. Again, as non-limiting examples, the first communication transceiver is a wireless communication device, such as a UE or other wireless communication apparatus, and the second communication transceiver is a supporting base station in a wireless communication network. In a particular example, the first communication transceiver is a UE or other apparatus configured in accordance with the LTE standards, and the second communication transceiver is an eNodeB configured for operation in an LTE-based cellular communication network.

Further according to this embodiment, the first communication transceiver includes a channel estimation circuit configured to generate channel estimates from the received reference signals, and one or more processing circuits configured to determine whether multi-rank transmission by the second communication transceiver is desired. According to this configuration, the processing circuit(s) determine whether multi-rank transmission is desired based on evaluating channel conditions as estimated from the reference signals. For the case when multi-rank transmission is desired, the processing circuits are configured to send a multi-rank Channel Quality Information (CQI) report to the second communication transceiver that reports two or more CQI values, for use in adapting multi-rank transmissions to the first communication transceiver.

In particular, the report uses a reporting order that dictates which reported CQI value or values are reported as absolute values and which reported CQI value or values are reported as offsets relative to one or more of the absolute values, using a bounded differential reporting format. Correspondingly, the processing circuits dynamically determine the reporting order, to reduce under-reporting or over-reporting errors that arise from the use of the bounded differential reporting format.

In the same or another embodiment, the processing circuits are configured to determine whether multi-rank transmission by the second communication transceiver is desired, as compared to single-rank transmission. The determination is made based on estimating a first metric reflecting a single-rank channel capacity and a second metric reflecting a multi-rank channel capacity, and comparing the first and second metrics. Accordingly, determining that multi-rank transmission by the second communication transceiver is desired is based at least in part on determining that the multi-rank channel capacity is higher than the single-rank channel capacity. Conversely, the determination that single-rank transmission is desired is made at least in part based on determining that the single-rank channel capacity is higher than the multi-rank channel capacity.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
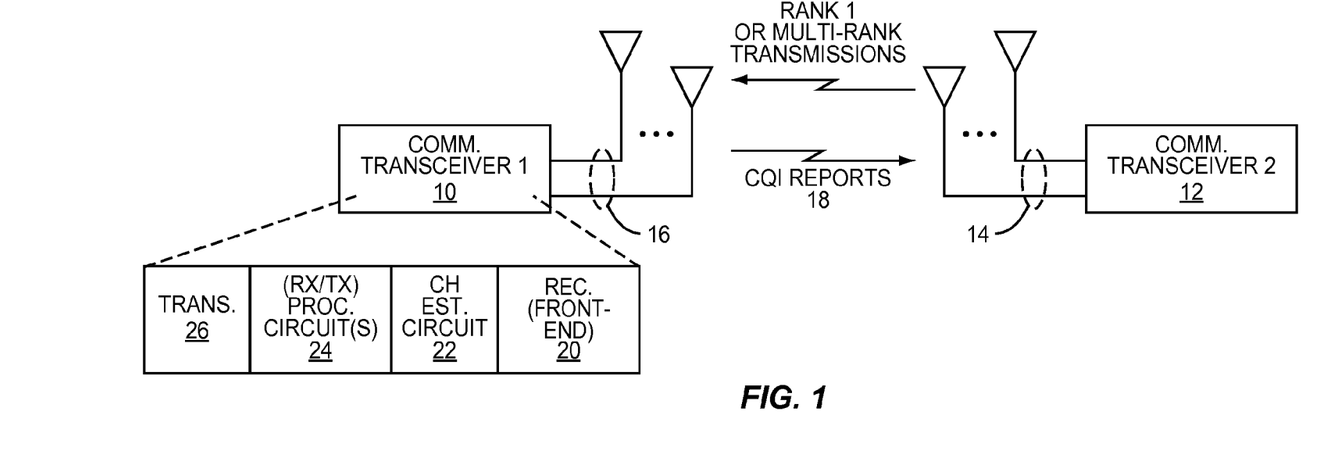
FIG. 1 is a block diagram of example embodiments of first and second transceivers, where the first transceiver receives transmissions from the second transceiver and provides corresponding CQI reports to the second transceiver, in accordance with the teachings provided herein.

By way of non-limiting example, FIG. 1 depicts an embodiment of a first transceiver 10 that receives single-rank or multi-rank transmissions from a second communication transceiver 12. In particular, the second communication transceiver 12 ("transceiver 12") is configured to adapt its transmissions to the first communication transceiver 10 ("transceiver 10"), including transmission rank determinations, according to Channel Quality Indicator (CQI) reports 18 fed back to the transceiver 12 by the transceiver 10.

Those of ordinary skill in the wireless communication arts will appreciate that the rank of a MIMO channel matrix identifies the number of layers used for transmission of a MIMO signal. In this regard, channel rank will be understood as indicating the number of data streams that can be transmitted in parallel over the MIMO channel. As was noted earlier herein, the maximum rank of a MIMO channel is given as min $(N_{TX}, N_{RX})$, where $N_{TX}$ denotes the number of transmit antennas available for MIMO transmission and $N_{RX}$ denotes the number of receive antennas available for reception of the MIMO transmission.

There may be a one-to-one mapping of data streams to layers, such that a Rank 2 transmission denotes two information streams, with each stream being transmitted on one of the layers. However, such is not always the case. For example, a given data stream may be mapped across two or more layers. In a baseline LTE example, an LTE MIMO transmitter transmits one codeword on a single layer, when operating in a Rank 1 transmission mode, and transmits two codewords, each on a different layer, when operating in a Rank 2 transmission mode. Here, an LTE codeword represents the coded bits for a given data stream, which are then mapped to modulation symbols for transmission.

The LTE baseline thus depends on a 2×2 configuration (two TX antennas and two RX antennas), and with a maximum of two codewords, denoted as CW1 and CW2. For Rank 1 transmission, which provides only one layer (Layer 1), only one codeword is transmitted, e.g., CW1 is mapped to Layer 1. For Rank 2 transmission, two codewords are transmitted, with CW1 mapped to Layer 1, and CW2 mapped to Layer 2. Of course, higher-rank implementations may be used, and other codeword- or stream-to-layer mappings may be used in higher-rank systems.

In any case, the transceiver 12 is configured for MIMO operation and correspondingly includes two or more antennas 14, for transmitting to the transceiver 10. Correspondingly, the transceiver 10 is configured for MIMO operation and includes two or more antennas 16, for receiving transmissions from the transceiver 12. The MIMO arrangement provides for spatial multiplexing MIMO and/or precoding MIMO, and the transceiver 12 thus may transmit to the transceiver 10 using single-rank transmissions, or using multi-rank transmissions.

As such, the CQI reports 18 returned to the transceiver 12 by the transceiver 10 include a RI, which indicates the preferred rank to be used for transmission to the transceiver 10. In turn, the transceiver 12 uses the CQI reports 18 to select single-rank or multi-rank transmission for transmitting to the transceiver 10. Of course, dynamically changing channel conditions may or may not allow for maximum rank transmission and user (UE) scheduling decisions and/or resource availability at the transceiver 12 also may influence the actual rank selected for transmission.

One sees that the transceiver 10 includes a receiver 20 that is configured to receive antenna-specific reference signals from the transceiver 12, or from any one or more other transceivers that support MIMO transmission to the transceiver 10. The receiver 20, in one or more embodiments, includes filters, amplifiers, gain control and digitization circuitry, and may include chains or branches of such circuitry for each receive antenna, to provide digital sample streams corresponding to the antenna-specific received signals.

It will be appreciated that the transceiver 10 generally receives signals sent on at least two different transmit antennas 14 by the transceiver 12. Each correspondingly received signal is then processed by the front-end circuitry in the receiver 20, which may include ADC and FFT processing circuitry. The transceiver 10 then uses the resulting processed signals to perform estimation of the channel(s) from the transceiver 12 to the transceiver 10. The transceiver 10 also may be configured to provide corresponding noise covariance estimates. From the channel estimates and noise covariance estimates the SNRs can be derived, which are then mapped to CQI values, for example.

In more detail, the transceiver 10, in one or more embodiments, includes a channel estimation circuit 22 that is configured to generate channel estimates from received reference signals, which may be pilot or other known symbol/signal information included in the signals transmitted by the transceiver 12. Still further, the transceiver 10 includes one or more processing circuits 24 configured to determine whether multi-rank transmission by the transceiver 12 is desired, based on evaluating channel conditions as estimated from the reference signals.

In this regard, it will be appreciated that the transceiver 10, in one or more embodiments, includes digital processing circuitry, such as one or more microprocessor and/or Digital Signal Processor (DSP) circuits. In particular, in at least one such embodiment, the processing circuits 24 are programmable digital processing circuits that are programmed (configured) to operate according to the teachings herein, based on their execution of computer program instructions stored in memory or other non-transient computer-readable medium within the transceiver 10.

According to one or more such configurations, when multi-rank transmission is desired, the processing circuits 24 are configured to send a multi-rank Channel Quality Information (CQI) report 18 to the transceiver 12. For the baseline LTE example, the report 18 includes two CQI values corresponding to the two codewords (CQI1 for CW1 and CQI2 for CW2). The reporting order dictates which CQI value is reported as an "absolute" value and which CQI value is an offset value, according to a bounded differential format. For example, if CQI1 is first in the ordered format, it will be reported as a 4-bit value that indicates the SIR/SINR of the first codeword according to a defined CQI/SIR mapping (e.g., in dB). Then, as the second ordered value, CQI2 is reported using a 3-bit value that indicates the offset of CQI2 relative to CQI1.

Beyond this baseline example, the present invention contemplates CQI reports that include multiple CQI values—e.g., a CQI value per layer, for multi-layer transmissions. In such cases, one or more of the per-layer CQI values may be reported using a bounded differential reporting format, while one or more others may be reported using absolute values. Broadly, the teachings herein are applicable to any type of CQI report where the reporting order of CQI values within the report dictate whether absolute or differential (relative) ranges are used for reporting the particular CQI values.

That is, the present invention applies for CQI reports where at least one CQI value is reported using an absolute value, and where at least one CQI value is reported relative to one or more of the absolute values, using a bounded differential reporting format. Advantageously, the processing circuits 24 are configured to dynamically determine the reporting order, to reduce under-reporting or over-reporting errors that arise from the use of the bounded differential reporting format.

Figure 2:
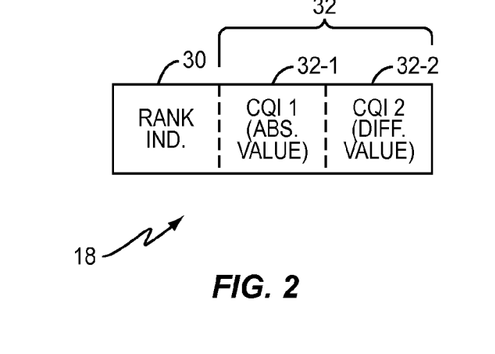
FIG. 2 is a diagram of a multi-rank CQI report, which includes two or more CQI values, wherein one or more of the values is reported in a bounded differential reporting format, and wherein the values are ordered according to a dynamically determined reporting order.

In this regard, it will be appreciated that the processing circuits 24 may include transmission processing functions, and are operatively associated with a transmitter 26 included within the transceiver 10. As such, data and control signaling generated or otherwise formed by the processing circuits 24 are sent via the transmitter 26, including the CQI reports 18 at issue here. By way of example, FIG. 2 illustrates an example structure/format for a CQI report 18, where the report 18 includes a rank indicator (RI) 30, and includes one or more CQI values 32—e.g., for multi-rank reporting, the report 18 includes two or more CQI values denoted as 32-1, 32-2, and so on. Further, according to one or more reporting standards contemplated herein, one or more of the CQI values 32 included in such multi-rank reports are reported as offsets relative to one or more of the absolute values, using a bounded differential reporting format—e.g., CQI value 32-2 is reported as a three-bit value representing an offset relative to the four-bit, absolute CQI value 32-1.

Figure 3:
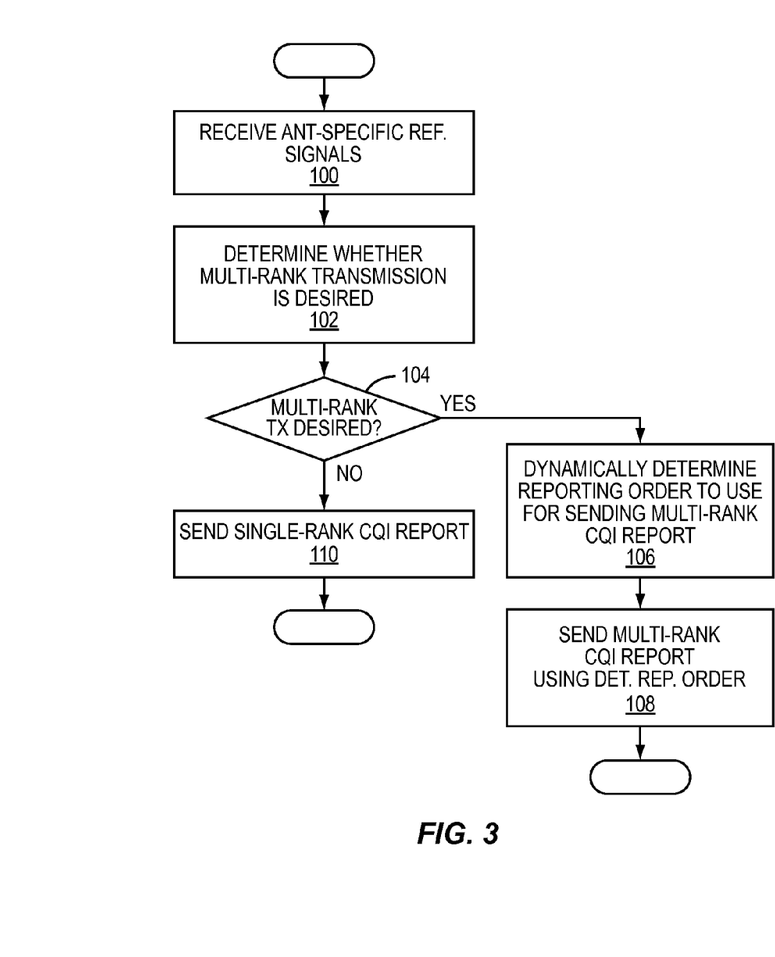
FIG. 3 is a logic flow diagram illustrating one embodiment of a method for dynamically determining the reporting order, to be used for reporting two or more CQI values in a multi-rank CQI report that applies a bounded differential reporting format to one or more of the CQI values.

With the above reporting format details in mind, along with the example apparatus of FIG. 1, FIG. 3 illustrates a logic flow diagram depicting one embodiment of a method implemented at the transceiver 10—e.g., by appropriate configuration of its processing circuits 24. The method provides for reporting channel quality from the transceiver 10, and includes receiving antenna-specific reference signals from the transceiver 12, or another communication transceiver that supports multi-rank spatial multiplexing transmission to the transceiver 10 (Block 100).

The method further includes determining whether multi-rank transmission by the transceiver 12 is desired, based on evaluating channel conditions as estimated from the reference signals (Block 102). If multi-rank transmission is desired (YES, from Block 104), the method includes dynamically determining the reporting order, to use for sending a multi-rank CQI report 18 to the transceiver 12 (Block 106), and sending the CQI report 18 according to the dynamically determined reporting order (Block 108). Conversely, if multi-rank transmission is not desired—i.e., single-rank transmission is preferred—then processing flows from the "NO" path exiting Block 104, to Block 110, wherein the transceiver 10 sends a single-rank CQI report 18.

As for determining whether to send the CQI report 18 as a single-rank report or as a multi-rank report, the processing circuits 24 are configured to make that decision based on certain evaluations related to making the best use of the channel between the transceiver 10 and the transceiver 12.

According to one embodiment, making that determination comprises determining whether multi-rank transmission by the transceiver 12 is desired (from the perspective of the transceiver 10) based: (a) on estimating a first metric reflecting a single-rank channel capacity and a second metric reflecting a multi-rank channel capacity; (b) comparing the first and second metrics; and (c) determining that multi-rank transmission by the second communication transceiver is desired, based at least in part on the multi-rank channel capacity being higher than the single-rank channel capacity. Conversely, determining that single-rank transmission by the transceiver 12 is desired, rather than multi-rank transmission, is based at least in part on determining that the single-rank channel capacity is higher than the multi-rank channel capacity.

The method in one or more embodiments further includes determining whether single-rank or multi-rank transmission by the transceiver 12 is desired—again, from the perspective of the transceiver 10—on a periodic basis, according to a reporting interval that defines how frequently CQI reports 18 are sent by the transceiver 10 to the transceiver 12. Here, in each case where multi-rank transmission is desired, the processing circuits 24 perform the step of dynamically determining the reporting order (e.g., Block 106).

In making the above determinations, estimating the first metric comprises, in one or more embodiments, estimating a first mutual information value or other channel capacity metric that assumes a diversity transmission by the transceiver 12. For example, the first metric is computed based on the received signal gain that would be obtained by the transceiver 12 using two or more of its antennas 14 for transmitting the same signal to the transceiver 10, for spatial transmission diversity gain.

In this regard, it will be appreciated that the channel estimation circuit 22 of the transceiver 10 is configured to estimate channel conditions with respect to particular transmit antennas 14 at the transceiver 12 and/or between specific pairings or combinations transmit antennas 14 and receive antennas 16. Thus, the processing circuits 24 can estimate the SNR gain or other signal improvement that would be gained by the transceiver 12 performing a diversity transmission to the transceiver 10.

Estimating the second metric, on the other hand, presupposes a multi-rank transmission by the transceiver 12, wherein the transceiver 12 sends independent streams via spatial multiplexing, with each spatial multiplexing layer carrying a different stream. This transmission configuration offers the potential of receiving more information, as compared to a single-rank transmission (even with diversity transmission), but that potential may not be realized, depending on channel conditions. Particularly, the full potential of multi-rank transmission may not be realized, given the use of a differential reporting format for multi-rank CQI reporting—e.g., CQI 32-1 reported using an absolute, 4-bit index value for a first spatial multiplexing channel and CQI 32-2 reported using a differential, 3-bit offset value for a second spatial multiplexing channel.

Returning to the baseline LTE example, a Rank 1 transmission uses a single codeword (CW1), while a Rank 2 transmission uses two codewords (CW1 and CW2), where CW1 is mapped to Layer 1 of the MIMO channel and CW2 is mapped to Layer 2 of the MIMO channel. In one embodiment for this context, the transceiver 10 is configured to compute the first metric as a mutual information value or other channel capacity metric corresponding to a 4-bit CQI value, as would be reported for a single codeword. Further, the transceiver 10 is configured to compute the second metric as a summation of the mutual information values or other channel capacity metrics, for the two codewords (CW1 and CW2), where the CQI for one of them is reported using the full 4-bit format, while the CQI for the remaining one of them is reported using the 3-bit differential reporting format. Here, the transceiver 10 can test which ordering [CQI1(4-bit), CQI2(3-bit)] or [CQI2(4-bit), CQI1(3-bit)] yields the highest or best second metric. The same logic and order-testing of course applies to embodiments where more than two CQI values are reported, and the actual logic used to calculate and test different reporting orders will depend on the actual report format under consideration—i.e., which CQI value positions are reported as absolute values and which ones are reported as offset values (and at what constraint).

Regardless, as a particular advantage, the computation of the second metric considers the particular constraints imposed by the differential reporting format. That is, with the differential reporting format, a first CQI value for a first quality estimate is reported in absolute, full-magnitude format, and a second CQI value for a second quality estimate is reported as a relative offset, using a constrained magnitude. To the extent that the quality difference between the first and second estimates is greater than the maximum offset that can be reported using the differential format, the second CQI value is misreported—i.e., it is indicated as being less good than it really is, or less bad than it really is.

Thus, according to the teachings herein, estimating the second metric comprises estimating a second mutual information value or other channel capacity metric, based on summing mutual information values or other channel capacity metrics, as estimated for the codewords or layers used in multi-rank MIMO transmission. To the extent that none of the CQI values 32-1, 32-2, etc., to be reported in the multi-rank CQI report 18 will be clipped by the differential reporting format, the second metric need not be adjusted. However, to the extent that one or more of the multi-rank CQI values 32 will be clipped by the differential reporting format, the processing circuits 24 are configured to compute the mutual information value or other channel capacity metrics in view of the clipped value(s). In this way, the processing circuits 24 make an intelligent comparison between channel capacity utilization for a Rank 1 transmission, as compared to that of a multi-rank transmission, in view of the constrained CQI reporting imposed by the differential reporting format.

If multi-rank transmission by the transceiver 12 is desired, the transceiver 10 sends a multi-rank Channel Quality Information (CQI) report to the transceiver 12 that reports two or more CQI values corresponding to respective spatial multiplexing layers, using a reporting order that dictates which reported CQI value or values are reported as absolute values and which reported CQI value or values are reported as offsets relative to one or more of the absolute values, using a bounded differential reporting format. In conjunction with such reporting, the transceiver 10 dynamically determines the reporting order to use, to reduce under-reporting or over-reporting errors that arise from the use of the bounded differential reporting format.

In at least one such embodiment, dynamically determining the reporting order comprises the processing circuits 24 of the transceiver 10 determining whether the bounded differential reporting format for an assumed reporting order limits any of the CQI values 32-1, 32-2, etc., to be reported, and, if so, determining whether another reporting order reduces or eliminates the under-reporting or over-reporting errors caused by such limits. If such other reporting order reduces or eliminates the under-reporting/over-reporting errors, that other reporting order is adopted for sending the multi-rank CQI report 18.

Broadly, in at least one embodiment, the transceiver 10 is configured to dynamically determine the reporting order by determining whether the bounded differential reporting format for an assumed reporting order limits any of the CQI values 32 to be reported. (Here, "CQI values 32" generically refers in the plural sense to two or more CQI values, e.g., 32-1 and 32-2. In the baseline LTE example, each CQI value corresponds to a codeword. In other contexts, each CQI value may correspond to, for example, a given layer associated with MIMO transmission. If the bounded differential reporting format for the assumed reporting order does not limit any of the CQI values 32 to be reported, the transceiver 10 uses the assumed reporting order for the CQI report 18. However, if the bounded differential reporting format for the assumed reporting order does limit any of the CQI values 32 to be reported, the transceiver 10 dynamically identifies which reporting order from two or more possible reporting orders corresponds to a highest effective channel capacity, and using the identified reporting order. "Possible" reporting orders refers to the ordering permutations that can be formed when reporting two or more CQI values 32 within a multi-rank CQI report 18.

In one embodiment, dynamically identifying which reporting order from the two or more possible reporting orders corresponding to the highest effective channel capacity comprises computing a sum of mutual information values for the CQI values to be reported in accordance with any limits imposed by each of the possible reporting orders being considered, and selecting the reporting order corresponding to the largest sum. In this regard, it will be understood that a CQI value denotes or otherwise relates to an underlying channel quality, which may be expressed as a signal-to-noise ratio (SNR) value in dB, etc. In turn, the SNR or other such quality measure of channel quality can be mapped to an information-bearing measure or other measure of channel capacity, such as a mutual information value. Of course, as SNR (or SINR) maps to CQI index values, one can form a mapping between CQI values and mutual information values.

Continuing with the baseline LTE example, assume that the transceiver 10 receives antenna-specific reference signals for two antennas, and correspondingly estimates first and second CQI values 32, denoted as CQI1 and CQI2, where CQI1 represents the estimated signal quality for the first codeword (CW1) and CQI2 represents the estimated signal quality for the second codeword (CW2). Assume that the value of CQI1 is 3 and the value of CQI2 is 12. (Those skilled in the art will recognize these values as "index" values, each corresponding to a different SNR range, which may be expressed in dB, for example.)

With these CQI values, the first codeword CW1 can carry 0.38 bits/symbol, giving a first mutual information value of MI1=0.38. With its much higher associated CQI value (12 versus 3), the second codeword CW2 can carry 3.90 bits/symbol, giving a second mutual information value of MI2=3.90. (Refer to the table given in Section 7.2.3 of 3GPP 36.213, Physical layer procedures, V9.1.0 (2010), for the mapping of CQI to MI.) Summing the MI values, the two codewords together can carry 4.28 bits.

However, for the reporting order [CQI1, CQI2], CQI2 must be reported as an offset value relative to CQI1, using a differential format that is bounded by an allowable offset interval of [−4, 3]. From that constraint, one sees that the maximum reportable value for CQI2 is 7. Now, a CQI value of 7 maps to an MI value of 1.48. This constrained value when summed with the MI value of CQI1 gives that a total reported MI value of 1.86. Thus, rather than being able to report the full quality/capacity of the channel, the constrained nature of the differential reporting format causes a substantial under-reporting—i.e., the MI of the as-reported CQIs is substantially lower than the actual MI.

Further, the Block Error Rate (BLER) for transmissions on the channel associated with CW2 and CQI2 becomes low, or even zero, as transmitter 12 codes those transmissions to an indicated channel quality that is much lower than the actual channel quality. Under-reporting thus leads to underutilization of the actual channel capacity.

In a converse example, assume that CQI1 is 12 and CQI2 is 3, and that CQI2 must be reported relative to CQI1, using the above-detailed differential reporting format. In this case, CQI2 is reported as 8, rather than 3, and is therefore significantly over-reported. Consequently, the transceiver 12 will code its CW2 transmissions for a channel quality significantly higher than the actual channel quality, and those transmission consequently will suffer a high error rate (effectively, the BLER will approach 1). At a BLER of 1, the channel effectively carries no information and, hence, only the data belonging to the CW1 transmissions will contribute to total throughput.

Thus, the processing circuits 24 of the transceiver 10 are programmed or otherwise configured to dynamically determine the reporting order to use, for ordering the CQI values 32 included in a multi-rank CQI report 18 sent from the transceiver 10. That is, the processing circuits 24 in at least one example embodiment are configured to determine whether [CQI1(4-bit), CQI2(3-bit)] or [CQI2(4-bit), CQI1 (3-bit)] more accurately reports the actual channel conditions. Of course, such processing and operations extend to more than two CQIs, nor, obviously, are they limited to 4-bit and 3-bit reporting formats.

Figure 4:
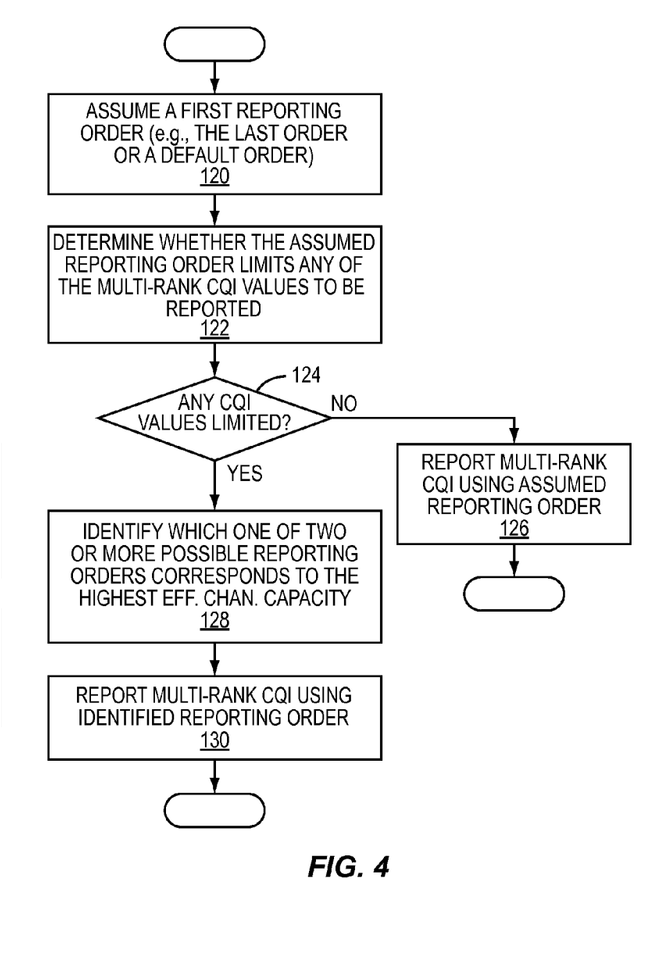
FIG. 4 is another logic flow diagram illustrating more example processing details, for dynamically determining the reporting order to use for reporting multiple CQI values in a multi-rank CQI report.

FIG. 4 illustrates one embodiment of a dynamic ordering method, where the processing begins with assuming a first reporting order (Block 120). The first reporting order may be a default ordering, or it may be the ordering remembered from the last dynamic ordering determination.

Processing continues with determining whether the assumed reporting order limits any of the multi-rank CQI values 32 to be reported (Block 122). That is, the processing circuits 24 determine whether the bounded differential reporting format, as applied to any CQI values 32 in the assumed reporting order, will "clip" any of those values.

If no CQI values 32 will be clipped according to the assumed reporting order ("NO" from Block 124), the processing continues with forming/sending a multi-rank CQI report 18, using the assumed reporting order (Block 126). On the other hand, if any of the CQI values 32 will be clipped if the assumed reporting order is used ("YES" from Block 124), then processing continues with identifying which one of two or more possible reporting orders corresponds to the highest effective channel capacity (Block 128). Once this "best" reporting order is identified, processing continues with forming/sending a multi-rank CQI report 18 (Block 130), wherein the included CQI values 32 are ordered according to the identified best reporting order.

In one example of the Block 128 processing, identifying the best reporting order comprises, for each possible sort order being evaluated, computing the mutual information values for each CQI value 32-$x$ to be reported, in accordance with any clipping that would be imposed on that CQI value 32-$x$ by reporting order being evaluated. Those mutual information values are then summed, to obtain a total mutual information value for the contemplated reporting order. In like manner, the processing circuits 24 obtain total mutual information values for each of the possible reporting orders being evaluated, compare those total mutual information values to identify the maximum total mutual information value, and choose the reporting order corresponding to that maximum.

Figure 5:
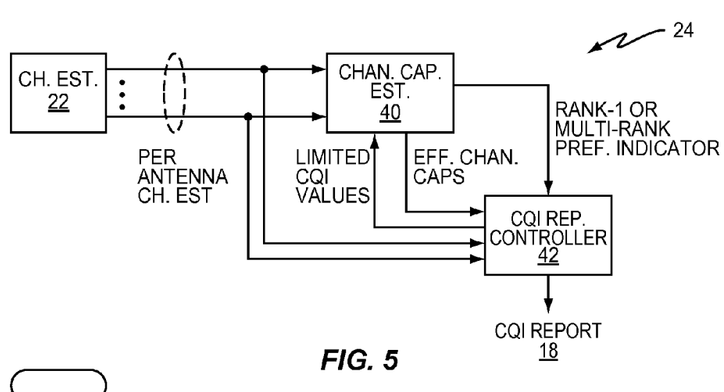
FIG. 5 is a block diagram illustrating one embodiment of example processing circuits that are configured according to the teachings disclosed herein.

FIG. 5 illustrates an example configuration of the processing circuits 24 for carrying out the above processing, or variations of such processing. In the illustration, the channel estimation circuit 22 provides per-antenna channel estimates to a channel capacity estimator 40, and to a CQI report controller 42. (It will be appreciated that these illustrated circuits may be implemented in whole or in part as fixed-hardware processing circuits, or in whole or in part as functional processing units within a DSP or microprocessor circuit, according to the execution of stored computer program instructions.)

The CQI report controller 42 provides the channel capacity estimator 40 with "limited" versions of the CQI values 32, which are the clipped values corresponding to one or more possible multi-rank reporting orders. In turn, the channel capacity estimator 40 estimates the effective channel capacity, as represented by each of the possible reporting orders, and provides those effective channel capacities, or corresponding indications of such, to the CQI report controller 42. The CQI report controller 42 uses those indicated effective channel capacities to identify the best reporting order, and formulates its CQI report 18 according to that best reporting order.

Of course, it may be, as explained earlier, that single-rank reporting is preferable to multi-rank reporting. That is, in some cases, the channel capacity reportable using the multi-rank format may be less than the channel capacity reportable using the single-rank format. Thus, the channel capacity estimator 40 may provide the CQI report controller 42 with a single-rank versus multi-rank preference indicator, or the CQI report controller 42 may be configured to make that determination on its own.

In either case, it will be understood that one or more embodiments of the processing circuits 24 are configured to determine that single-rank transmission by the transceiver 12 is desired from the perspective of the transceiver 10, rather than multi-rank transmission. In one such embodiment, that determination is based at least in part on determining that the single-rank channel capacity is higher than the multi-rank channel capacity, and, when single-rank transmission is desired, the CQI report controller 42 sends a single-rank CQI report to the transceiver 12, rather than a multi-rank CQI report 18.

This comparison is made, for example, by determining a single-rank mutual information value or other channel capacity metric, which may be based on assuming multi-antenna diversity transmission from the transceiver 12 to the transceiver 10, and then comparing that single-rank metric to a like metric determined for the best multi-rank reporting order. Single-rank reporting generally will be preferred whenever the single-rank channel capacity metric, rather than the multi-rank metric, is closer to the actual channel capacity.

Figure 6:
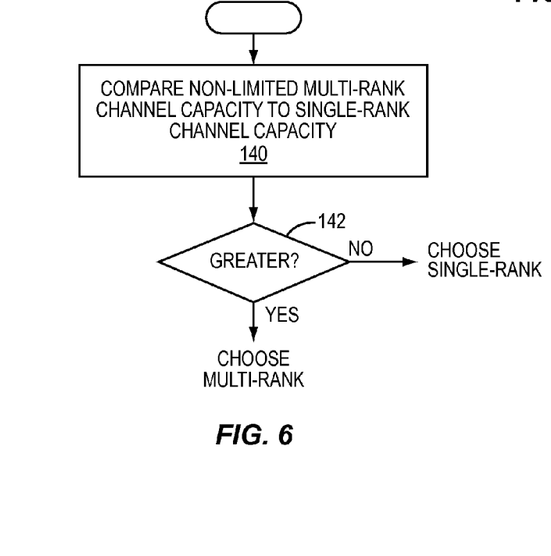
FIGS. 6 and 7 are logic flow diagrams illustrating different embodiments of a method for determining whether to use single-rank or multi-rank CQI reporting.

FIG. 6 illustrates one embodiment of a method of choosing single-rank or multi-rank CQI reporting. According to the illustrated processing, the processing circuits 24 compare the non-limited multi-rank channel capacity to the single-rank channel capacity (Block 140). Here, "non-limited" connotes the channel capacity without consideration of any differential format reporting constraints. If the non-limited multi-rank channel capacity is greater ("YES" from Block 142), then the multi-rank CQI reporting format is chosen. Otherwise, single-rank reporting is chosen.

In a particular embodiment along the above lines, the processing circuits 24 are configured to estimate a first metric (representing single-rank transmission) as a first mutual information value or other channel capacity metric that assumes a diversity transmission by the transceiver 12, and to estimate a second metric (that assumes multi-rank transmission of a certain rank) as a second mutual information value or other channel capacity metric. This second metric is calculated by summing mutual information values or other channel capacity metrics, as estimated for the individual spatial multiplexing layers assumed for the multi-rank transmission. More particularly, such a calculation is made for each possible multi-rank reporting order, and the best one of those metrics is compared to the single-rank metric and, on that basis, the processing circuits 24 decide whether single-rank or multi-rank transmission is preferred.

Figure 7:
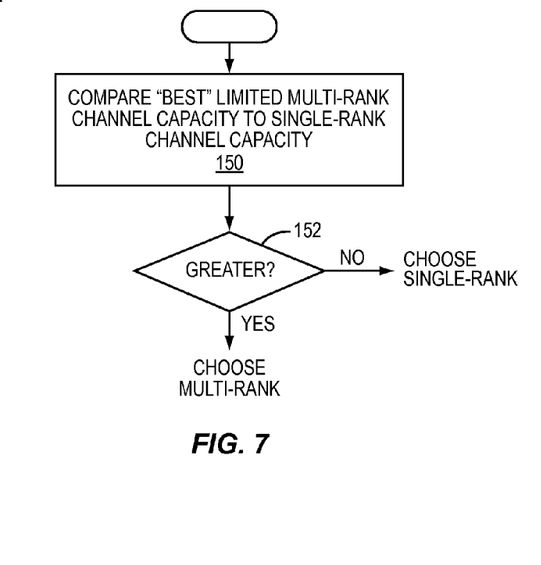

Such processing is depicted in the example method of FIG. 7. Here, processing includes comparing the "best" limited multi-rank channel capacity to the single-rank channel capacity (Block 150). In other words, the processing circuits 24 are configured to compare the multi-rank channel capacities in consideration of any under-reporting or over-reporting effects arising from use of the bounded differential reporting format against the single-rank channel capacity. If the best reportable multi-rank channel capacity is greater than the single-rank channel capacity ("YES" from Block 152), the processing continues with forming/sending a multi-rank CQI report 18. Otherwise, single-rank reporting is chosen.

Those skilled in the art will recognize that there are other channel capacity metrics or formulations that can be used than the examples given above. Further, there are other approaches to determining mutual information values, such as mapping from SNR to mutual information, rather than mapping from CQI. Broadly, the present invention contemplates that the processing circuits 24 are configured to identify a reporting order for reporting two or more CQI values 32 in a multi-rank CQI report 18, where the identified reporting order eliminates or reduces under-reporting and over-reporting errors arising from the use of a differential reporting format for any one or more of those CQI values 32. Here, "under-reporting" and "over-reporting" denote that the reported channel quality will overstates or understates actual channel quality/capacity, to the extent that the bounded differential reporting format clips one or more of the reported CQI values.

Thus, according to the teachings presented herein, the transceiver 10 formulates and sends CQI reports 18 that give as advantageous an indication of actual conditions for the transceiver 10 as is possible. This reporting improvement is obtained in one instance by switching the meaning of the codeword numbering in a multi-rank CQI report 18, e.g., CW1 becomes CW2 and CW2 becomes the former CW1. As these reported values are identifiable at the transceiver 12, e.g., based on their antenna-specific nature, the dynamic switching of CQI value ordering in the CQI reports 18 does not upset operations at the transceiver 12, nor does it require the transceiver 10 to apprise the transceiver 12 of the switched orders.

Assuming the Rank 2 case, where antenna-specific CQI1 and CQI2 are estimated, the transceiver 10 can be configured to switch the CQI reporting order from [CQI1, CQI2] to [CQI2, CQI1] responsive to determining that CQI2>CQI1 and (MI1+MI2')<MI2. Here, the "'" accent mark denotes a limited (clipped) value resulting from use of the bounded differential reporting format. That is, it is assumed that the second ordered CQI value in the CQI report 18 is reported as a bounded differential value relative to the first CQI value, using a reduced number of bits. Thus, to the extent that the differential reporting format would clip or otherwise limit that reported value, the processing circuits 24 can compute a correspondingly constrained mutual information value MI'. The reporting order can be switched back when the same condition is satisfied for the reversed ordering, or when Rank-1 reporting is used.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of reporting channel quality from a first communication transceiver comprising:
receiving antenna-specific reference signals from a second communication transceiver that supports multi-rank and single-rank transmission to the first communication transceiver;
determining whether multi-rank transmission by the second communication transceiver is desired, based on evaluating channel conditions as estimated from the reference signals; and
when multi-rank transmission is desired:
sending a multi-rank Channel Quality Information (CQI) report to the second communication transceiver that reports two or more CQI values for use in adapting multi-rank transmission to the first communication transceiver, using a reporting order that dictates which reported CQI value or values are reported as absolute values and which reported CQI value or values are reported as offsets relative to one or more of the absolute values, using a bounded differential reporting format; and
dynamically determining the reporting order, to reduce under-reporting or over-reporting errors that arise from the use of the bounded differential reporting format.

2. The method of claim 1, further comprising determining whether multi-rank transmission by the second communication transceiver is desired based on estimating a first metric reflecting a single-rank channel capacity and a second metric reflecting a multi-rank channel capacity, comparing the first and second metrics, and determining that multi-rank transmission by the second communication transceiver is desired, based at least in part on the multi-rank channel capacity being higher than the single-rank channel capacity.

3. The method of claim 2, further comprising determining that single-rank transmission by the second communication transceiver is desired, rather than multi-rank transmission, based at least in part on determining that the single-rank channel capacity is higher than the multi-rank channel capacity, and, when single-rank transmission is desired, sending a single-rank CQI report to the second communication transceiver.

4. The method of claim 3, further comprising determining whether single-rank or multi-rank transmission by the second communication transceiver is desired on a periodic basis, according to a reporting interval that defines how frequently CQI reports are sent by the first communication transceiver to the second communication transceiver, and, in each case where multi-rank transmission is desired, performing said step of dynamically determining the reporting order.

5. The method of claim 2, wherein estimating the first metric comprises estimating a first mutual information value or other channel capacity metric that assumes a single-rank diversity transmission by the second communication transceiver, and wherein estimating the second metric comprises estimating a second mutual information value or other channel capacity metric, based on summing mutual information values or other channel capacity metrics, as estimated for multi-rank transmission.

6. The method of claim 1, wherein said dynamically determining the reporting order comprises determining whether the bounded differential reporting format for an assumed reporting order limits any of the CQI values to be reported, and if so, determining whether another reporting order reduces or eliminates the under-reporting or over-reporting errors caused by such limits, and, if so, adopting the other reporting order.

7. The method of claim 1, wherein said dynamically determining the reporting order comprises determining whether the bounded differential reporting format for an assumed reporting order limits any of the CQI values to be reported; and
if the bounded differential reporting format for the assumed reporting order does not limit any of the CQI values to be reported, using the assumed reporting order for the CQI report; and
if the bounded differential reporting format for the assumed reporting order does limit any of the CQI values to be reported, dynamically identifying which reporting order from two or more possible reporting orders corresponds to a highest effective channel capacity, and using the identified reporting order.

8. The method of claim 7, wherein dynamically identifying which reporting order from the two or more possible reporting orders corresponding to the highest effective channel capacity comprises computing a sum of mutual information values or other channel capacity metrics for the CQI values to be reported in accordance with any limits imposed by each of the possible reporting orders being considered, and selecting the reporting order corresponding to the largest sum.

9. A first communication transceiver comprising:
a receiver configured to receive antenna-specific reference signals from a second communication transceiver that supports multi-rank and single-rank transmission to the first communication transceiver;
a channel estimation circuit configured to generate channel estimates from the received reference signals;
one or more processing circuits configured to determine whether multi-rank transmission by the second communication transceiver is desired, based on evaluating channel conditions as estimated from the reference signals, and when multi-rank transmission is desired, to:
send a multi-rank Channel Quality Information (CQI) report to the second communication transceiver that reports two or more CQI values for use in adapting multi-rank transmission to the first communication transceiver, using a reporting order that dictates which reported CQI value or values are reported as absolute values and which reported CQI value or values are reported as offsets relative to one or more of the absolute values, using a bounded differential reporting format; and
dynamically determine the reporting order, to reduce under-reporting or over-reporting errors that arise from the use of the bounded differential reporting format.

10. The first communication transceiver of claim 9, wherein the one or more processing circuits are configured to determine whether multi-rank transmission by the second communication transceiver is desired based on estimating a first metric reflecting a single-rank channel capacity and a second metric reflecting a multi-rank channel capacity, comparing the first and second metrics, and determining that multi-rank transmission by the second communication transceiver is desired, based at least in part on the multi-rank channel capacity being higher than the single-rank channel capacity.

11. The first communication transceiver of claim 10, wherein the one or more processing circuits are configured to determine that single-rank transmission by the second communication transceiver is desired, rather than multi-rank transmission, based at least in part on determining that the single-rank channel capacity is higher than the multi-rank channel capacity, and, when single-rank transmission is desired, to send a single-rank CQI report to the second communication transceiver.

12. The first communication transceiver of claim 11, wherein the one or more processing circuits are configured to determine whether single-rank or multi-rank transmission is desired on a periodic basis, according to a reporting interval that defines how frequently CQI reports are sent by the first communication transceiver to the second communication transceiver, and, in each case where multi-rank transmission is desired, to dynamically determine the reporting order.

13. The first communication transceiver of claim 10, wherein the one or more processing circuits are configured to:
estimate the first metric as a first mutual information value or other channel capacity metric that assumes a single-rank diversity transmission by the second communication transceiver; and
estimate the second metric as a second mutual information value or other channel capacity metric, based on summing mutual information values or other channel capacity metrics, as estimated for multi-rank transmission.

14. The first communication transceiver of claim 9, wherein the one or more processing circuits are configured to dynamically determine the reporting order based on determining whether the bounded differential reporting format for an assumed reporting order limits any of the CQI values to be reported, and if so, determining whether another reporting order reduces or eliminates the under-reporting or over-reporting errors caused by such limits, and if so, adopting the other reporting order.

15. The first communication transceiver of claim 9, wherein the one or more processing circuits are configured to dynamically determine the reporting order based on determining whether the bounded differential reporting format for an assumed reporting order limits any of the CQI values to be reported; and
if the bounded differential reporting format for the assumed reporting order does not limit any of the CQI values to be reported, using the assumed reporting order for the CQI report; and
if the bounded differential reporting format for the assumed reporting order does limit any of the CQI values to be reported, dynamically identifying which reporting order from two or more possible reporting orders corresponds to a highest effective channel capacity, and using the identified reporting order.

16. The first communication transceiver of claim 15, wherein the one or more processing circuits are configured to dynamically identify which reporting order from two or more possible reporting orders corresponds to the highest effective channel capacity based on computing a sum of mutual information values or other channel capacity metrics for the CQI values to be reported in accordance with the limits imposed by each of the possible reporting orders being considered, and selecting the reporting order corresponding to the largest sum.

* * * * *